Nov. 28, 1939.  P. GUGGENHEIM  2,181,327
AUTOMOBILE RADIO ANTENNA
Filed May 9, 1938
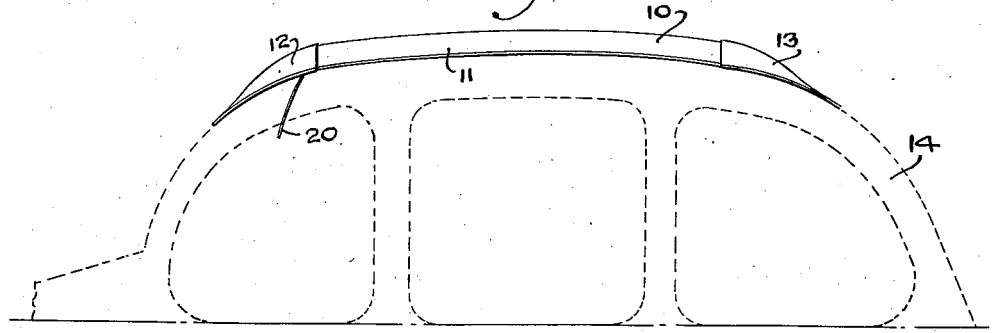
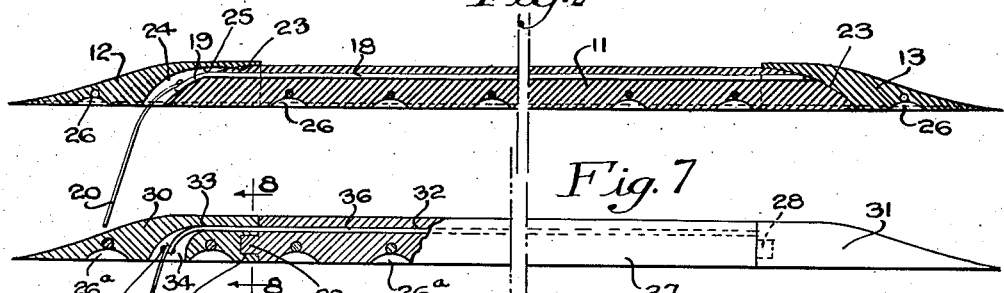
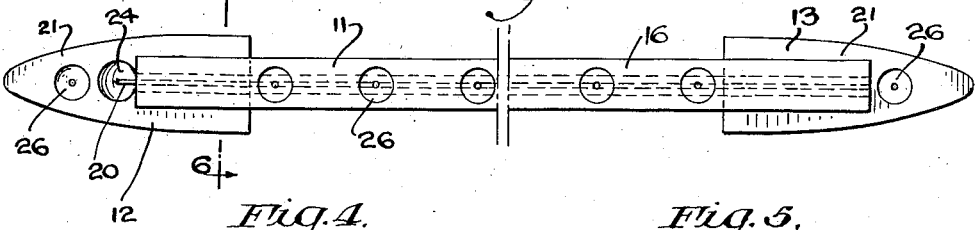
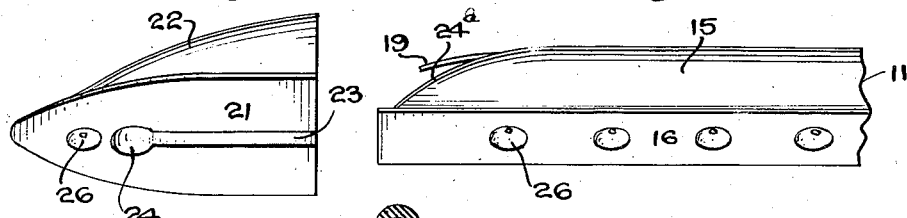
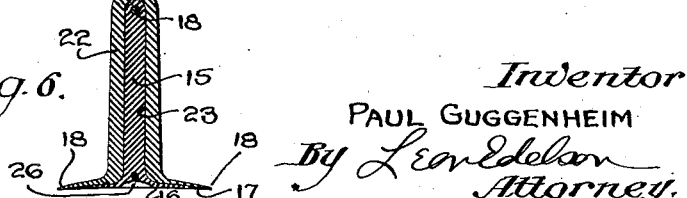
Inventor
PAUL GUGGENHEIM
By Leo Edelson
Attorney.

Patented Nov. 28, 1939

2,181,327

UNITED STATES PATENT OFFICE 2,181,327

AUTOMOBILE RADIO ANTENNA

Paul Guggenheim, Philadelphia, Pa., assignor to Philadelphia Metal Drying Form Company, Philadelphia, Pa., a corporation of Pennsylvania Application May 9, 1938, Serial No. 206,730

11 Claims. (Cl. 250—33)

This invention relates to radio antenna constructions and more particularly to an improved construction thereof for installation upon the top of automotive vehicles, particularly such as are equipped with the so-called metal turret tops.

It has long been recognized in the art that the most efficient location for an automobile radio antenna is at the top of the vehicle. With the advent of the turret roof constructed entirely of metal, resort has been had to locating aerials beneath the chassis or running boards of the car or to the use of conspicuous wire aerials secured in position externally of the car, usually upon the top thereof. While the installation of aerials externally of the car body, as upon the roof thereof, affords much better reception than when installed beneath the vehicle chassis or within the vehicle body, such externally located aerials have not improved the general appearance of the vehicle so equipped therewith and in the majority of instances have definitely detracted from the pleasing lines of the car.

Moreover, the installation of unprotected wire aerials externally of the car body has proved to be a constant source of trouble and annoyance because, subjected as they are to the vagaries of different weather conditions, such as rain, snow, ice, wind and the like, they soon corrode or so discolor as to become quite unsightly in appearance and often are so weakened as to be readily torn down by heavy winds and the strong air currents to which they are particularly subject when the car is in rapid motion.

The present invention has as its principal objects the design and construction of an aerial assembly which is ideally suited for installation upon the roof of a vehicle, which provides all-weather protection for the aerial wire or cable itself, which lends itself readily to be shaped to the contour of the vehicle top, and which when installed becomes such an integral part of the vehicle top that it enhances the general appearance thereof.

More specifically, it is an object of the present invention to provide a flexible rubber molding within which the aerial cable is embedded to completely protect it from the elements, the said molding being so designed and constructed that when installed upon the roof of the automobile it is in complete harmony with the intended design and appearance of the latter.

A further object is to provide a rubber covered aerial assembly which is sufficiently flexible to readily adapt itself to the longitudinal contour of the vehicle roof upon which it is installed and yet is of a rigidity and stability adequate to withstand the severest strains to which it may be subjected in actual use.

Still another object is to provide an aerial assembly of the character aforesaid which is composed of complementally associated parts which permit the assembly to be accurately fitted to and upon automobile roofs of different contours and varying lengths.

A still further object is the provision of an aerial assembly having means for readily securing the same in position upon the turret top of an automobile so that it assumes the appearance of being an integral part of the automobile top, said means being operative to secure the aerial in position without the necessity of employing any special tools and without requiring any structural alterations in the automobile top.

Further objects and advantages of the invention, such as those relating to economies and advantages effected by the constructional details of the present aerial, will be apparent more fully hereinafter.

The present invention consists substantially in the combination, construction, location and relative arrangement of parts, all as will be described hereafter, as shown in the accompanying drawing, and as finally pointed out in the appended claims.

In the said accompanying drawing:

Figure 1 is a side elevational view of the aerial assembly shown mounted upon the roof of a passenger car, the latter being shown in dotted lines;

Figure 2 is a longitudinal vertical sectional view of the aerial assembly as constructed in accordance with and embodying the principles of the present invention;

Figure 3 is a bottom plan view of the aerial;

Figure 4 is a perspective view of one of the end members of the aerial assembly;

Figure 5 is a perspective view of a portion of the intermediate member thereof;

Figure 6 is a transverse vertical sectional view taken on the line 6—6 of Figure 3;

Figure 7 is a longitudinal vertical sectional view of a modified construction of the aerial assembly; and Figure 8 is a transverse vertical sectional view taken on the line 8—8 of Figure 7.

Referring now more particularly to the drawing, it will be observed that the aerial of the present invention, designated generally by the reference numeral 10, is composed of three principal parts consisting of an elongated intermediate body member 11 and opposed end cap members 12 and 13. All of these parts are formed of molded rubber or other such flexible material having electrical insulating properties and are respectively formed of such complemental shape that the same may be fitted together in assembled relation upon the roof of a vehicle body 14 to provide in effect the appearance of a unitary aerial mounting.

The central or intermediate body member 11 of the aerial assembly is of substantially inverted T-shape providing an upstanding relatively thin web or flange 15 having at its bottom edge a relatively wide supporting base 16, the opposite longitudinal edges of which are preferably tapered to feathered edges, as at 17 (see Figure 6). This intermediate body member 11 may be of any desirable length depending upon the length of the automobile top upon which the aerial assembly is to be mounted. Embedded in the upstanding web or flange 15 of this central body member 11 of the aerial assembly is an antenna wire or cable 18 one end of which, as at 19, projects freely beyond the corresponding end of its rubber support 11 for convenient securement to the conventional lead-in wire 20 connecting to the aerial post of the radio receiving set (not shown). While the antenna cable 18 may be embedded within the rubber 11 during the process of molding the latter, it is preferable to provide the member 11 during the molding process with a longitudinally extending bore extending throughout its length and into which the antenna cable may be projected. This latter practice is preferable due to the fact that varying lengths of automobile roofs require corresponding variations in the overall length of the aerial unit and by forming the central body member 11 with a longitudinally extending bore into which the antenna cable may be inserted, the body 11 may be cut to any desired length to subsequently receive within the bore thereof an antenna cable of such length that one end thereof projects beyond the corresponding end of the member 11, as at 19, to provide a terminal extremity to which the lead-in wire 20 may be secured.

The end cap members 12 and 13 are substantially similar in construction, each being of a configuration adapted to snugly embrace the opposite extremities of the elongated intermediate body member 11. As appears most clearly in Figures 2, 4 and 6, these end cap members 12 and 13, both of which are molded of rubber or other such flexible material, comprise a substantially flat base 21 and an upstanding web or flange 22 extending longitudinally of the said base 21. This upstanding flange or web 22 of the end cap members is of somewhat greater thickness than the corresponding upstanding web or flange 15 of the intermediate body member 11 and each is recessed, as at 23, for snug accommodation therein of the proximate ends of the upstanding web or flange 15 of the central body member. As appears most clearly in Figure 2, the recess 23 formed in the member 12 is of somewhat greater depth longitudinally of said member than is the corresponding recess in the member 13 in order to afford additional space 24 to accommodate the outwardly projecting end 19 of the antenna cable to which the lead-in 20 is secured. This space 24 thus serves not only to accommodate the freely projecting extremity 19 of the antenna cable but also the connection which joins said extremity to the lead-in wire 20.

The base 21 of each of the end cap members 12 and 13 is preferably somewhat wider than the base 16 of the intermediate body member 11 and, as in the case of the base 16 of the said intermediate body member, the opposite sides of the base 17 are tapered to a substantially feather edge, as at 18, to overlap and conceal from view the portions of the base 16 embraced by the end cap member.

As appears most clearly in Figures 2, 4 and 5, the opposite ends of the upstanding flange 15 of the intermediate body member 11 are curved, as at 24a, while the internal recess 23 of the end cap members 12 and 13 are correspondingly curved in their upper edges 25 so as to respectively accommodate snugly therein substantial portions of the opposite ends of the central body 11. By so providing the curved or rounded extremities 24a on the body member 11 and the complementally curved recesses in the end cap members 12 and 13, the upper edges of the latter may be contoured as best shown in Figures 1 and 2 to provide gradually decreasing depths toward the outer extremities thereof.

In addition, the base of each end cap member is decreased in width toward its outer extremity, in consequence of which each cap member is of such gradually reduced body mass in its outer extremity that it may be sharply bent to conform to almost any contour in the roof of the vehicle.

As has been indicated hereinbefore, the body member 11 is also of sufficient flexibility as to permit it to be longitudinally shaped to the contour of the automobile top from which it will appear that when the parts 11, 12 and 13 are assembled as just described and shown the under surfaces of the bases thereof may be readily brought into intimate, flatwise contact with the surface of the automobile top. While the members 11, 12 and 13 in their assembled relation may be secured in position upon the automobile top by any suitable adhesive material applied between the under surface of the aerial unit and the top surface of the automobile roof, it may be preferable to provide a form of attachment which renders the unit readily removable as desired. To that end, the members 11, 12 and 13 are provided in their respective bottoms with a plurality of longitudinally spaced rubber vacuum cups 26 which may be built into the parts 11, 12 and 13 as integral elements thereof or which may be detachably secured in position therein in any manner and by any suitable means. In the form of unit illustrated, these vacuum cups 26 are snap-fitted within suitable sockets formed in the members 11, 12 and 13 during the process of molding the same and by their proper application and use, these vacuum cups serve adequately to secure the aerial unit immovably in position upon the top surface of the automobile roof without danger of injury to the finish thereof.

Figures 7 and 8 illustrate a somewhat modified construction of an aerial assembly embodying the principles of the present invention. In this modified assembly, the intermediate body member 27 which corresponds to the member 11 of Figure 2 is provided at either end thereof with tenons 28 which are respectively adapted to be snugly fitted within suitable mortises 29 provided in the end members 30 and 31. These end members 30 and 31 are in all respects the functional equivalents of the members 12 and 13 of the unit shown in Figure 2. As appears quite clearly in Figure 7, the intermediate body member 27 is provided with a longitudinally extending bore 32 which is adapted for registry with a bore 33 formed in one of the end members, such as that designated 30. The bore 33 in this end member 30 terminating in an enlarged downwardly presenting opening or recess 34 of a size sufficient to readily accommodate therewithin the connection 35 between the free extremity of the areial cable 36 and the lead-in wire 37 connecting to the radio-receiving set.

In assembling the unit of Figure 7, the aerial cable 36 is projected through the registering bores 32 and 33 of the members 37 and 30 and the latter are then joined together by the mortise and tenon elements 29 and 28. The opposite end member 31 is likewise secured to the opposite end of the member 27 by similar mortise and tenon elements and, if desired and in order to provide a more or less permanent assembly of the several elements, the abutting surfaces of the member 27, 30 and 31 immediately surrounding the mortise and tenon joints may be adhesively secured together. The base of the member 27 is of substantially the same order as the base of the member 11 of the assembly shown in Figure 2 and this base is continued through the end members 30 and 31 to provide a substantially flat securing surface for the assembled unit. As in the form of the unit shown in Figure 2, the base of the modified assembly may be adhesively secured in position upon its supporting surface or it may be attached thereto by means of vacuum cups 26a similar in all respects to those hereinbefore described in connection with the form of the invention shown in Figures 2 to 6, inclusive.

It will be understood, of course, that the present invention is not limited in its application to use as an automobile roof aerial but instead may be employed generally as an aerial assembly wherever it may be conveniently installed. It is further to be understood that the present invention is not limited to the mechanical details of construction herein illustrated and shown but instead is susceptible of various structural modifications such as would not involve a departure from the general principles or real spirit of this invention. Accordingly, the invention is claimed broadly, as well as specifically, as indicated in the appended claims.

What is claimed as new and useful is:

1. An aerial assembly comprising, in combination, an elongated flexible main body member of insulating material, said member having a cross-section of greater vertical depth than width, an aerial cable encased within and extending lengthwise of said body member, and a pair of end enclosures for said body member also formed of flexible insulating material and each of a cross-section similar to that of said main body member and adapted to snugly embrace the opposite extremities of said main body member.

2. An aerial assembly comprising, in combination, a flexible elongated body member of insulating material, said member being of inverted T-shaped cross-section to form an upstanding rib having a flat supporting base, an aerial cable encased within and extending lengthwise of said body member, a pair of end enclosures also formed of flexible insulating material adapted to snugly embrace the opposite extremities of said main body member, and means in one of said enclosures for accommodating a connection between said cable and a lead-in wire to the radio receiving set.

3. An aerial unit comprising, in combination, an elongated body member formed of insulating material and having a longitudinally extending bore therein adapted to receive an aerial cable, said body member being throughout of a substantially uniform cross-section having a substantially flat base and a rib projecting upwardly therefrom and adapted to be cut to length as desired, and an aerial cable insertable within the bore of said body member and adapted to have one end thereof connected to the lead-in wire of a radio receiving set.

4. An automobile aerial installation comprising, in combination, an automobile top, a flat-bottomed rib of insulating material projecting upwardly from the surface of said automobile top and extending longitudinally between spaced points on said top, an aerial cable encased within and extending lengthwise of said rib, means for connecting one extremity of said aerial cable to a radio receiving set lead-in wire, and means in the bottom of said rib for securing the same in position.

5. An automobile aerial installation comprising, in combination, an automobile top, a flat-bottomed rib of insulating material projecting upwardly from the surface of said automobile top and extending longitudinally between spaced points on said top, an aerial cable encased within and extending lengthwise of said rib, means for connecting one extremity of said aerial cable to a radio receiving set lead-in wire, means operatively associated with opposite ends of said rib to weatherproof the exposed parts of said aerial cable and said lead-in wire, and means in the bottom of said rib for securing the same in position.

6. In an automobile antenna installation, in combination, an automobile top, a vertically extending flat-bottomed rib of insulating material projecting upwardly from the surface of said automobile top, an aerial cable encased within and extending lengthwise of said rib, flat-bottomed end members secured to opposite extremities of said rib and constituting longitudinal extensions thereof, said end members serving as weatherproof seals for the exposed parts of said aerial cable, and a plurality of vacuum cup elements longitudinally spaced along the bottoms of said rib and end members for securing the same in position.

7. In an automobile antenna installation, in combination, an automobile top, a vertically extending rib of insulating material projecting upwardly from the surface of said automobile top, an aerial cable encased within and extending lengthwise of said rib, and end members secured to opposite extremities of said rib and constituting longitudinal extensions thereof, said end members serving as weatherproof seals for the exposed parts of said aerial cable, one of said end members being provided with a recess presenting downwardly thereof and accessible through the base of said end member to accommodate a connection between said aerial cable and the lead-in wire from a radio receiving set.

8. An aerial assembly comprising, in combination, an elongated flexible main body member of insulating material, said member being of a cross-section having a flattened base and an upstanding rib, an aerial cable encased within and extending lengthwise of said body member, and a pair of end members for said body member also formed of flexible insulating material, said end members being each of a cross-section similar to that of said main body member and being joined thereto in longitudinal continuation thereof.

9. An aerial assembly comprising, in combination, an elongated flexible main body member of insulating material, said member being of a cross-section having a flattened base and an upstanding rib, an aerial cable encased within and extending lengthwise of said body member, and a pair of end members for said body member also formed of flexible insulating material, said end members being each of a cross-section similar to that of said main body member and being joined thereto in longitudinal continuation thereof, said main body member and at least one of said end members being provided with registering bores through which said aerial cable may be projected.

10. An aerial assembly comprising, in combination, an elongated flexible main body member of insulating material, said member being of a cross-section having a flattened base and an upstanding rib, an aerial cable encased within and extending lengthwise of said body member, and a pair of end members for said body member also formed of flexible insulating material, said end members being each of a cross-section similar to that of said main body member and being joined thereto in longitudinal continuation thereof, said main body member and at least one of said end members being provided with registering bores through which said aerial cable may be projected, the bore in said last-mentioned end member terminating in an enlarged opening presenting downwardly through the base of said end member to accommodate therein a connection between said aerial cable and said lead-in wire.

11. An aerial assembly comprising, in combination, an elongated flexible main body member of insulating material, said member being of a cross-section having a flattened base and an upstanding rib, an aerial cable encased within and extending lengthwise of said body member and a pair of end members constituting longitudinal continuations of said body members and respectively joined to opposite ends thereof by mortise and tenon connections.

PAUL GUGGENHEIM.